Oct. 21, 1930.    H. SCHLAICH    1,779,294
INDICATING INSTRUMENT SWITCH
Filed March 4, 1924    2 Sheets-Sheet 1
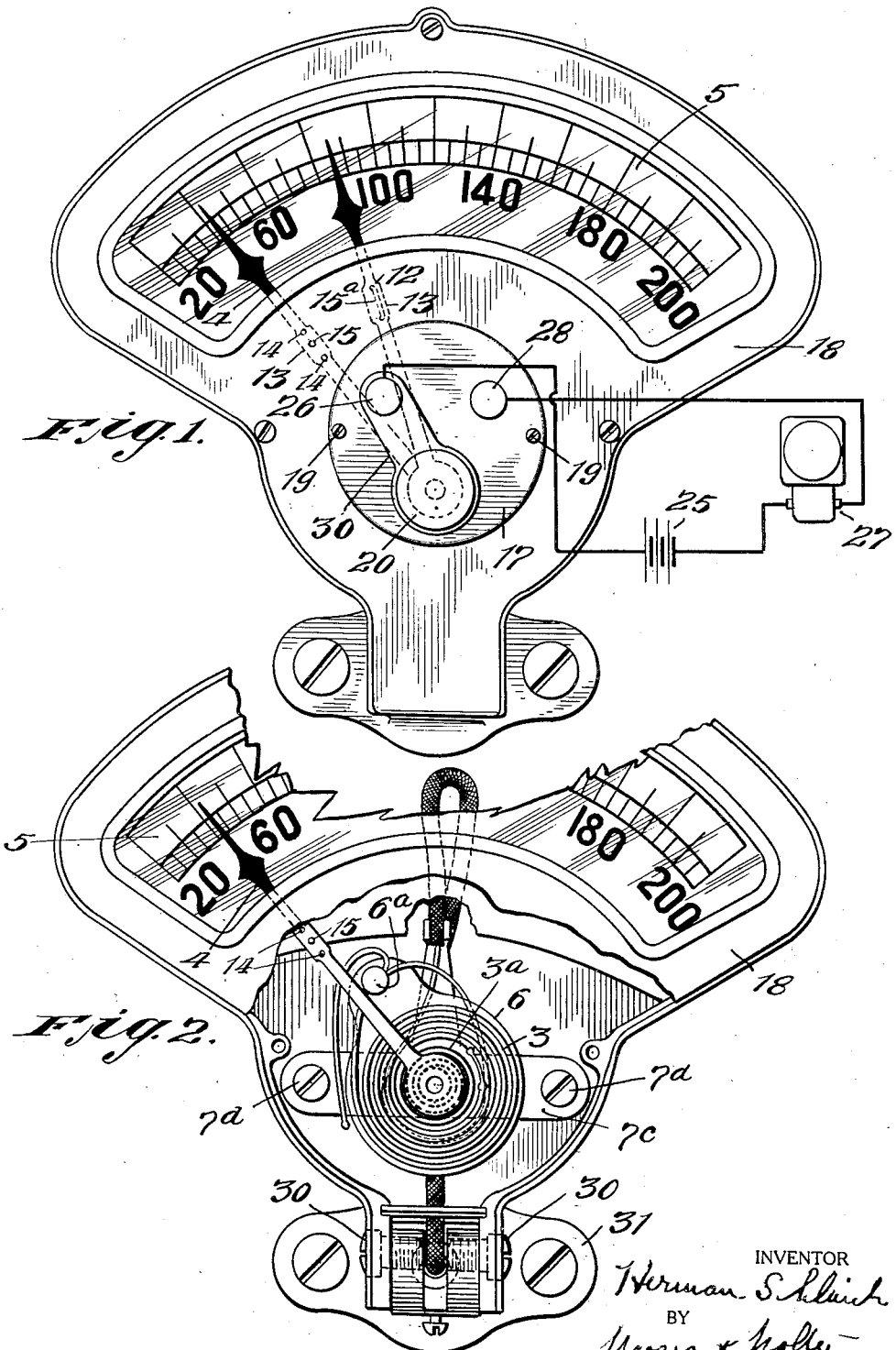

Oct. 21, 1930.　　　　H. SCHLAICH　　　　1,779,294
INDICATING INSTRUMENT SWITCH
Filed March 4, 1924　　　2 Sheets—Sheet 2
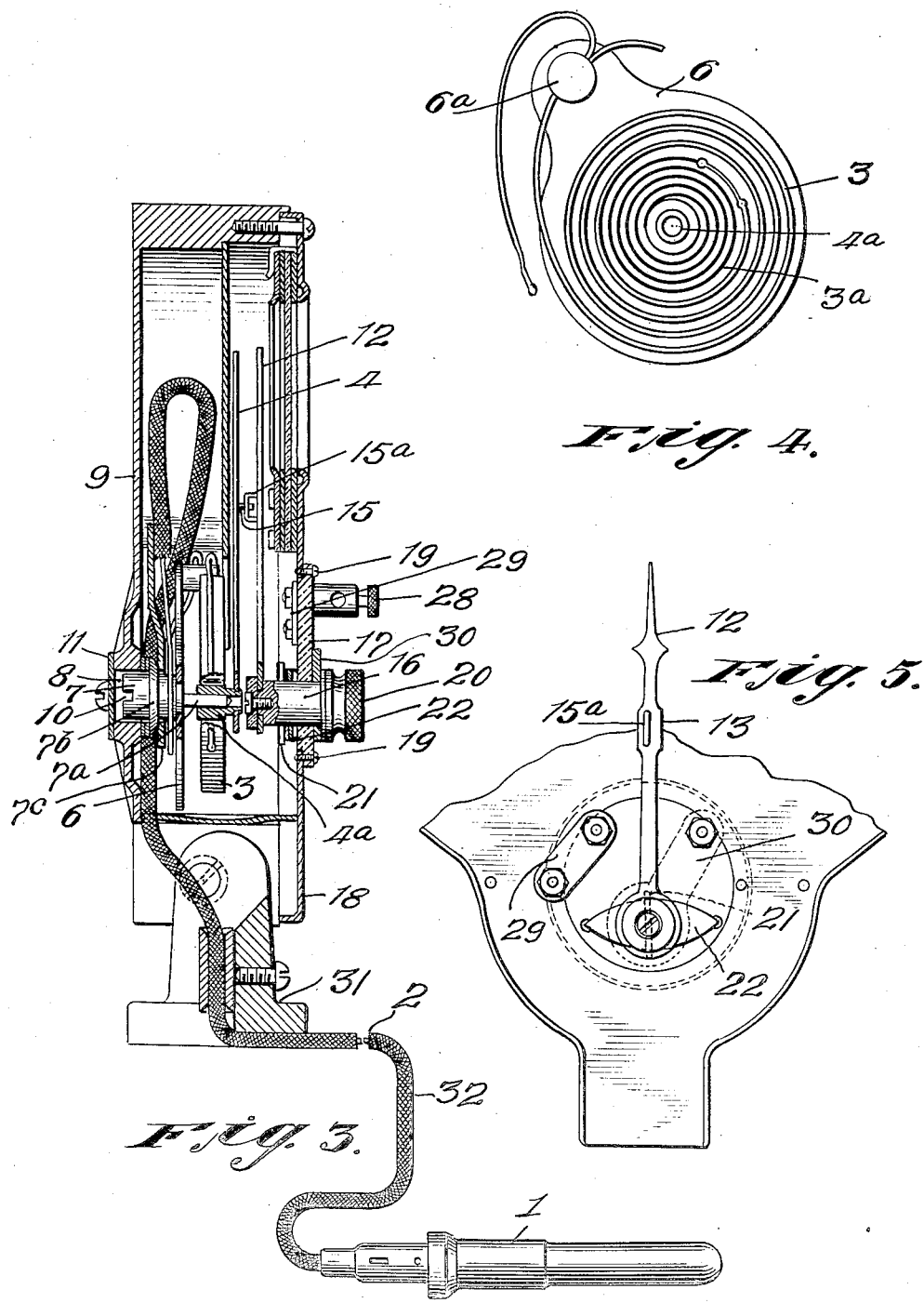

Patented Oct. 21, 1930

1,779,294

UNITED STATES PATENT OFFICE

HERMAN SCHLAICH, OF LONG ISLAND CITY, NEW YORK

INDICATING INSTRUMENT SWITCH

Application filed March 4, 1924.- Serial No. 696,614.

This invention relates to announcing or recording instruments, such as thermometers of the type adapted to announce or record when the temperature has reached a predetermined point by giving an audible or visible signal such as, for instance, ringing a bell or lighting a light.

It is an object of this invention to improve and simplify the construction of instruments of this kind so as to reduce the cost thereof and to render them less likely to get out of order and easier to repair than the prior instruments of this type.

Another object of the invention is to provide an announcing instrument in which the expensive and delicate wiping electrical contacts heretofore used are replaced by simple, rugged and positively engaging contacts, without subjecting the instrument to distorting strains when the movable element of the instrument is held stationary by the engagement of the rigid contact members.

Referring now to the drawings, which illustrate the invention embodied in a thermometer: Figure 1 is a front elevation of such a thermometer; Figure 2 is a similar view with parts of the cover broken away to show the interior construction of the device; Figure 3 is a longitudinal sectional elevation through the thermometer casing; Figure 4 is a detail view of the Bourdon coil showing the compensating spring inside the same; and Figure 5 is a rear view of the cover plate illustrating the method of completing the electric circuit through the instrument.

The temperature indicating parts of the thermometer shown herein are described and claimed in my copending application, Serial No. 696,562, filed March 3, 1924, to which reference may be had for a more complete description of the same. The present application is a continuation in part of this copending application, in which there is disclosed a bulb connected by means of a flexible tubing, a Bourdon coil which, through a compensating coil, turns a hub to move a pointer over a scale.

They comprise briefly a bulb 1 connected by means of a flexible tube 2 to a Bourdon coil 3. The bulb, tube and coil are filled with a suitable temperature responsive fluid which, upon contraction or expansion, causes the coil 3 to coil or uncoil and, through the agency of a compensating coiled spring $3^a$, to move the pointer 4 on the hub $4^a$ back and forth over the scale 5.

The hub $4^a$ turns on a spindle $7^a$ projecting out from the arbor 7; and the outer end of the Bourdon coil 3 is secured to a post $6^a$ carried by a rotatable plate 6 which is secured to the arbor 7, the center of the coils 3 and $3^a$ and the hub $4^a$ being coincident with the spindle $7^a$. The arbor 7 is provided with a flange $7^b$ adapted to bear on washers interposed between it and the back of the indicator casing 9; and a plate $7^c$, cooperating with said flange and secured to the casing 9 by screws $7^d$, serves to hold the flange $7^b$ of the arbor 7 in frictional engagement with said washers. The head of the arbor 7 projects into a hole 8 through the back of the indicator casing 9, and a screw driver slot 10 in the head of the arbor 7 provides a means for turning the arbor 7, the plate 6, the coils 3 and $3^a$, the hub $4^a$ and the pointer 4 carried thereby, for the purpose of adjusting the position of the pointer on the scale, as described in my copending application above identified. A cover plate 11 is placed over the hole 8 to prevent unauthorized tampering with the thermometer mechanism.

The hand or pointer 4 which is moved back and forth over the scale 5, and the set contact hand 12 through which the electric signalling circuit is completed, are of the same shape and construction, so that hands formed by the same stamping operation may be used either as pointers 4 or as set contact hands 12. Each includes near the mid-portion thereof an enlargement 13 which is formed during the process of manufacture with three aligned holes 14.

In the middle hole 14, preferably on the indicating hand or pointer 4, a contact pin 15 is soldered or otherwise secured; and in the two outside holes 14 in the set contact hand 12, a bridge or contact member 15ª is mounted so as to project into the path of the pin 15 when the pointer 4 moves over the scale to the position at which the set contact hand 12 is set.

The set contact hand 12 is mounted on a rotatable shaft 16 which passes through a disc of insulating material 17 held in the cover 18 of the casing 9 by means of the screws 19.

On the outside of the casing, the shaft 16 is provided with a knurled knob 20 by which the shaft can be turned to set the contact hand 12 at the desired point on the scale where the signal is to be given.

To hold the set contact hand 12 in the position to which it is turned, the shaft 16 on the inside of the casing is bored to receive the pin 21 which cooperates with a bow shaped leaf spring 22 which is mounted between the pin 21 and the back of the disc 17 and pulls the knob 20 into firm frictional engagement with the face of the disc 17. Thus the contact member or contact hand 12 is rigidly adjustable.

When using the thermometer to announce any desired temperature by means of audible or visible signals, one terminal of a battery 25 is connected to the binding post 26 on the insulating block 17, and the other terminal of the battery is connected through a bell or bulb 27 to the binding post 28, which is electrically connected with the casing of the thermometer by the connector 29. A connector 30 extends between the binding posts 26 and the shaft 16.

Assuming that it is desired to have the thermometer announce the temperature of 140° F., the hand 12 will be turned to 140°, and when the hand 4 is turned to this point by the uncoiling of the Bourdon coil 3 due to the expansion of the fluid in the bulb 1 by heat to which said bulb may be subjected, the contacts 15 and 15ª will meet, and the alarm circuit will be completed from the battery 25 to the binding post 26, thence through the connector 30 to the hand 12, thence through the contacts 15ª and 15 to the hand 4, thence through the indicating mechanism and casing of the instrument and the connector 29 to the binding post 28, and thence through the bell or bulb 27 back to the battery. After completion of this circuit, the bell or bulb 27 will continue to announce the temperature of 140°, until the temperature is reduced and the hand 4 carrying the contact 15 moves away from the contact 15ª and breaks the alarm circuit.

If, after the contact is made, the temperature should continue to rise and further uncoil the Bourdon coil 3, thereby tending to move the pointer 4 higher up the scale, the set contact hand 12 will prevent the movement of the hand 4, and the compensating coil 3ª which is like a fine hair spring of bimetallic material will then take up the strain on the instrument parts, thereby preventing permanent distortion of either the Bourdon coil or the pointer 4. When the temperature is lowered and the contact 15 on the pointer 4 moves away from the contact 15ª on the hand 12, the compensating spring 3ª will return to its normal position and the hub 4ª and pointer 4 will return to their normal position, so that the thermometer will register temperatures as accurately as it did before the temperature responsive element was subjected to the distorting strain.

As described in my copending application above identified, the casing 9 of the present instrument is pivotally attached by means of the screws 30 to a bracket support 31, so that, due to the flexibility of the tube 2 and the braided cable 32 with which it is covered, the indicating portion of the instrument may be tilted to various positions relative to its support and read with ease in any of its positions.

It will be seen that I have provided a very simple, rugged and inexpensive announcing instrument which may be safely subjected to temperatures in excess of that which it is set to announce, without distorting or straining the same, and it is to be understood that the specific embodiments of my invention which have been shown and described herein are by way of example only, and that various modifications and changes can be made therein without departing from the spirit of the invention or the scope of the appended claims.

What I claim is:

1. In an indicator of the type described, in combination, a scale, a set contact hand, an indicating hand, means for moving the indicating hand back and forth over the scale, including a Bourdon coil and a bimetallic compensating spring between the Bourdon coil and the indicating hand, and rigid contact members on the two hands, adapted to arrest the indicating hand and to make electrical contact with one another when the indicating hand reaches the position at which the contact hand is set.

2. In an indicating and warning instrument of the type described, a rigidly adjustable contact member, an indicating member movable into and out of contact with said contact member to close and open a signal circuit, and means for moving the indicating member, including a Bourdon coil and a compensating coiled spring between the Bourdon coil and the indicating member.

3. In a temperature indicating and warning instrument, in combination, a temperature responsive element, an indicator hand movable to indicate temperatures at said element, operating connections between the element and the indicator hand comprising a Bourdon coil and a yielding bi-metallic compensating spring, and a positive stop in the path of said indicator hand for arresting it and making contact with it when a pre-determined temperature is reached to close a warning signal circuit.

In testimony whereof I have affixed my signature to this specification.

HERMAN SCHLAICH.